United States Patent
Wang (10) Patent No.: US 8,970,497 B2
(45) Date of Patent: Mar. 3, 2015

(54) COMPUTER MOUSE WITH ADJUSTABLE DECORATIVE WING

(71) Applicant: Dexin Corporation, New Taipei (TW)

(72) Inventor: Ting-Sheng Wang, New Taipei (TW)

(73) Assignee: Dexin Corporation, New Taipei (TW)

( * ) Notice: Subject to any disclaimer, the term of this patent is extended or adjusted under 35 U.S.C. 154(b) by 114 days.

(21) Appl. No.: 13/751,083

(22) Filed: Jan. 26, 2013

(65) Prior Publication Data
US 2014/0210718 A1    Jul. 31, 2014

(51) Int. Cl.
G06F 3/033     (2013.01)
G09G 5/08      (2006.01)
G06F 3/0354    (2013.01)

(52) U.S. Cl.
CPC .................................. *G06F 3/03541* (2013.01)
USPC .......................................... 345/163; 345/157

(58) Field of Classification Search
CPC .. G06F 3/033; G06F 3/03541; G06F 3/03543
See application file for complete search history.

(56) References Cited

U.S. PATENT DOCUMENTS

| 3,152,742 | A | * | 10/1964 | Wright | 226/74 |
| 4,676,619 | A | * | 6/1987 | Woolley | 396/432 |
| 6,027,100 | A | * | 2/2000 | Dube et al. | 254/89 R |
| 2005/0174331 | A1 | * | 8/2005 | Vayda | 345/167 |
| 2008/0155784 | A1 | * | 7/2008 | Hsu et al. | 16/303 |

FOREIGN PATENT DOCUMENTS

WO    WO 2006046815 A1 *  5/2006

* cited by examiner

*Primary Examiner* — Kent Chang
*Assistant Examiner* — Mark Edwards
(74) *Attorney, Agent, or Firm* — Li & Cai Intellectual Property (USA) Office (57) ABSTRACT

A computer mouse with adjustable decorative wing includes a main housing, a bottom board covered on the bottom surface of the main housing, a decorative wing disposed on one side of the main housing and a distance-adjusting mechanism. The decorative wing has a fastening end fixed to the main housing, and a movable end. There is a adjustable distance between the movable end and the main housing. The distance-adjusting mechanism is disposed on the main housing and contacts the movable end of the decorative wings for adjusting the distance of the movable end and the main housing of the decorative wings. A width of the computer mouse therefore is changed. The decorative wings on two sides of the computer mouse of the present invention can be expanded to support fingers for suiting to different users' palms.

13 Claims, 8 Drawing Sheets

COMPUTER MOUSE WITH ADJUSTABLE DECORATIVE WING

BACKGROUND OF THE INVENTION

1. Field of the Invention

The present invention relates to a computer mouse with adjustable decorative wing; in particular, to a computer mouse having at least one decorative wing, which is disposed on one side thereof and can be adjusted outward or inward for supporting different user's finger suitably.

2. Description of Related Art

Computer mouse is used commonly as an inputting device to control a cursor of computer. The cursor appeared on the screen of computer can be moved by moving the computer mouse on a plane. And, when a button of the computer mouse is pushed, a programming command can be inputted to the computer.

A conventional computer mouse usually has an exterior housing which is grasped by user, and a bottom board which is fixed on the bottom of the exterior housing. A mouse-wheel or button is arranged on the exterior housing for controlling computer. If user operates the computer mouse with right hand, the thumb is disposed on the left side of the exterior housing, and the little and ring fingers are disposed on the right side of the exterior housing. However, the exterior housing of the conventional computer mouse has a unchangeable size, and the width of the exterior housing is not adjustable according user's palm. Different users need to adapt themselves to the same size of computer mouse, unless the manufactory produces various exterior housings of different sizes for one computer mouse so as to be selectable by user. However, such way will increase the manufacturing cost and inventory risk.

In summary of the above, the inventor believes that improvements can be made, and through devoted research combined with applicable theory, finally proposes a reasonable and effective design which improves upon the above mentioned deficiencies.

SUMMARY OF THE INVENTION

The present invention provides a computer mouse with adjustable decorative wing, whose width between two sides can be adjusted by users themselves so as to be adapted ergonomically for different palms of users.

In order to achieve the aforementioned objects, the present invention provides a computer mouse with adjustable decorative wing that includes a main housing, a bottom board covered on a bottom of the main housing, a decorative wing disposed on one side of the main housing and a distance-adjusting mechanism. The decorative wing has a fastening end fixed to the main housing and a movable end. An adjustable distance is formed between the movable end and the main housing. The distance-adjusting mechanism is disposed on the main housing and against the movable end of the decorative wing so as to adjust the distance between the movable end of the decorative wing and the main housing. A width of the computer mouse is therefore changed.

An advantage of the present invention is that the decorative wings on two sides of the computer mouse are expandable to suit different users' palm.

In order to further the understanding regarding the present invention, the following embodiments are provided along with illustrations to facilitate the description of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
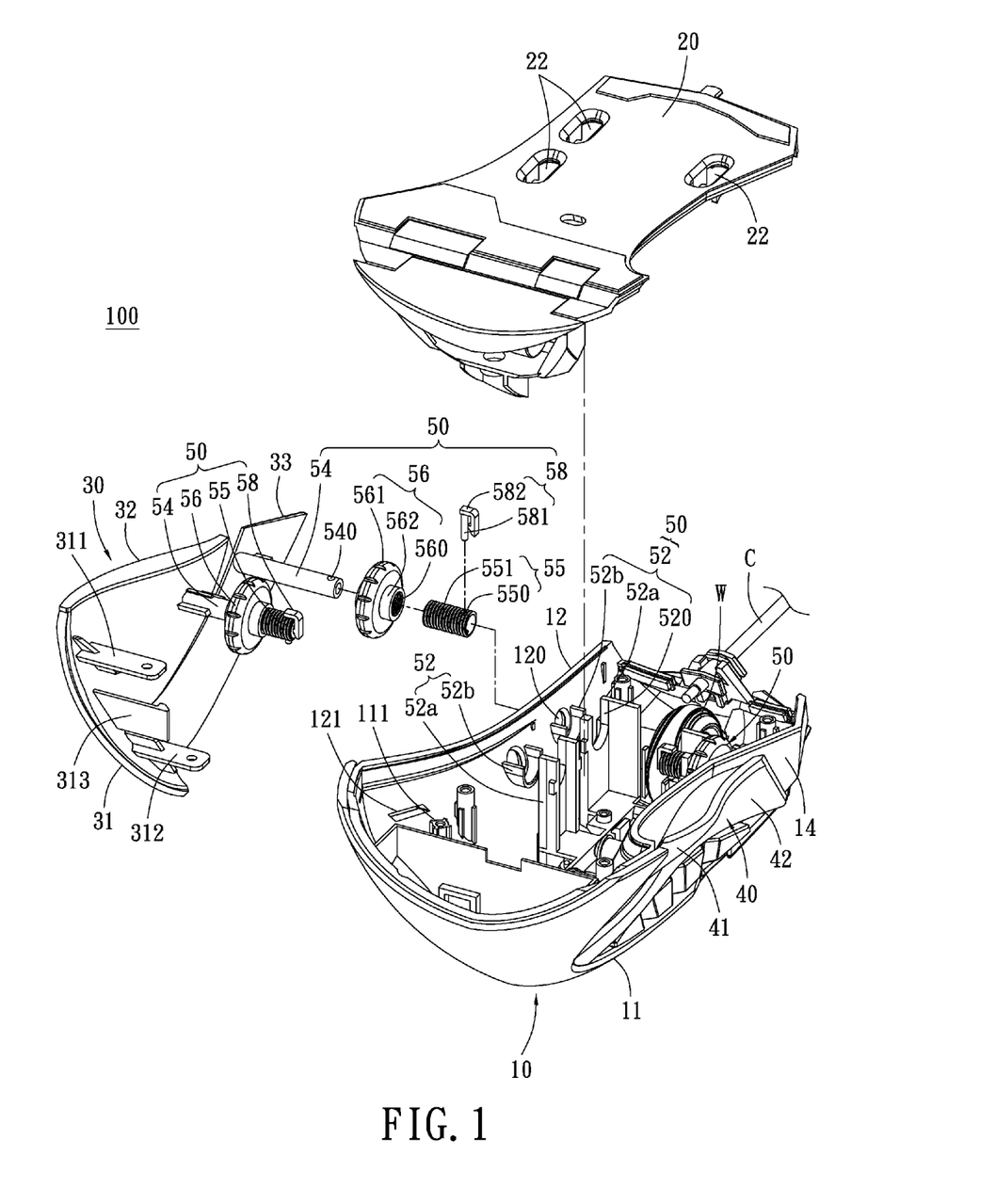
FIG. 1 shows a perspective exploded view of a computer mouse with adjustable decorative wing of the present invention.
Figure 2:
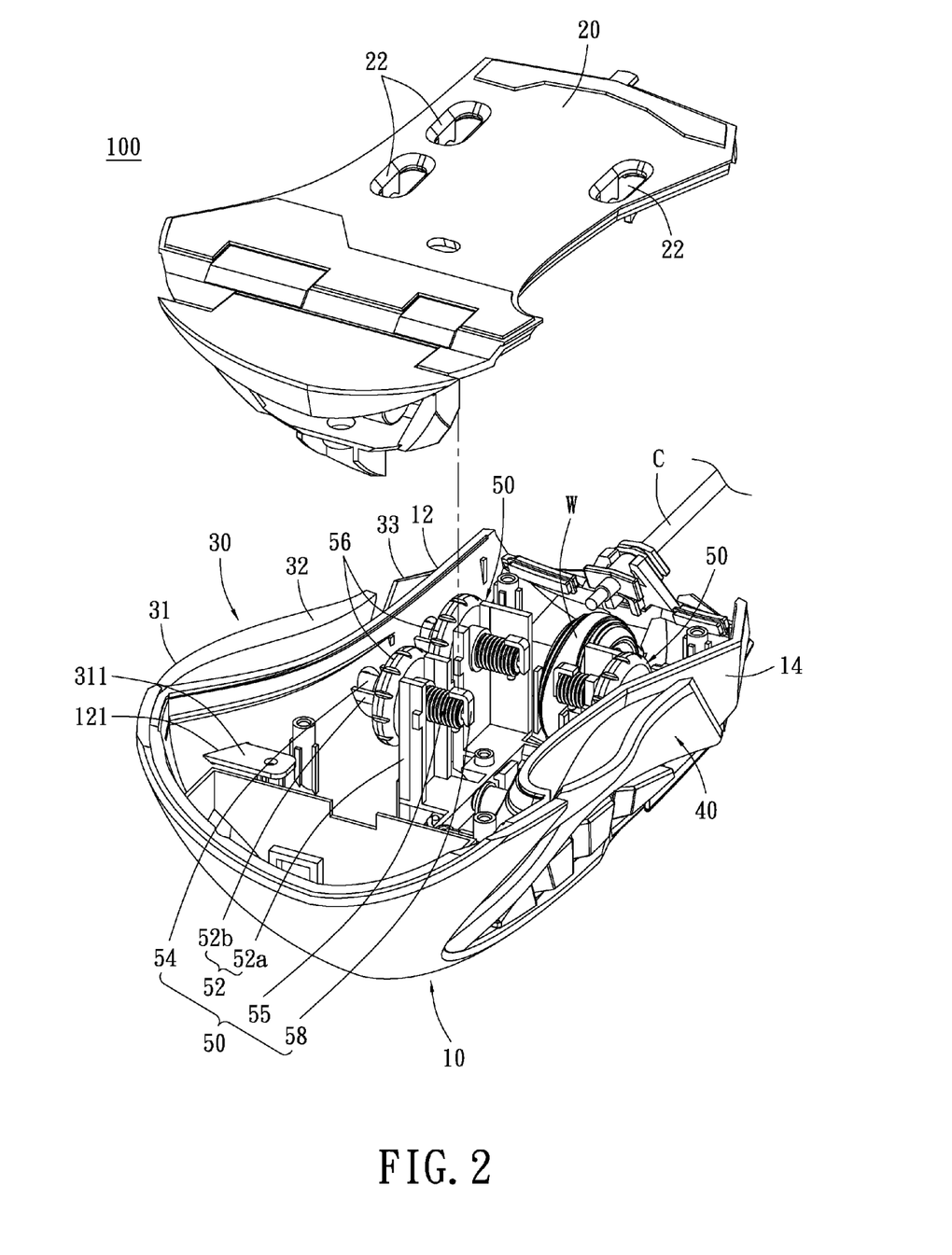
FIG. 2, shows a perspective assembled view of the computer mouse with adjustable decorative wing (non-adjusted, a bottom board was moved) of the present invention.

Please refer to FIGS. 1 and 2, which are perspective exploded view and perspective assembled view of computer mouse with adjustable decorative wing according to the present invention. The present invention provided a computer mouse with adjustable decorative wing 100, which includes a main housing 10, a bottom board 20 covered on a bottom of the main housing 10, a pair of decorative wings 30, 40 disposed on two sides of the main housing 10, and a plurality of distance-adjusting mechanisms 50. Each of the decorative wings 30, 40 has a fastening ends 31, 41 fixed to the main housing 10, and a movable end (as the labeled numbers 32, 33, 42 shown in FIG. 1) extended from the fastening ends 31, 41. There is an adjustable distance between the movable ends and the main housing 10. The distance-adjusting mechanisms 50 are disposed on the main housing 10 and contact with the movable ends (as the labeled numbers 32, 33, 42 shown in FIG. 1) of the decorative wings 30, 40. This embodiment utilizes the distance-adjusting mechanisms 50 to adjust the adjustable distance between the movable ends of the decorative wings 30, 40 and the main housing 10, so that the appearance of the computer mouse is able to adjust according to the size of user's palm, especially the width of the computer mouse. Therefore, the computer mouse according to the present invention is more ergonomic.

The computer mouse 100 has a receiving space between the main housing 10 and the bottom board 20 to receive elements for controlling cursor, such as a cable C, a circuit board, decoding devices, and mouse-wheel W . . . etc. Besides, the present invention can be applied on a wireless or corded computer mouse. The main housing 10 has a top portion 11, and two side boards 12, 14 extended curvedly from two sides of the top portion 11. The side boards 12, 14 are extended to the inner side of the decorative wings 30, 40, respectively. In other words, the two side boards 12, 14 are disposed between the main housing 10 and the decorative wings 30, 40, respectively. The side boards 12, 14 have an opening 120 respectively (wherein the side board 14 is partially covered by the decorative wing 40, and the opening is hid and not shown). The shaft 54 passes through the opening 120. The side boards 12, 14 can not only protect the elements disposed in the main housing 10, but also help to fix the distance-adjusting mechanism 50. However, the side boards can be omitted in this embodiment, and the relative structure can be disposed in the inner side of the top portion 11 of main housing 10.

Figure 3:
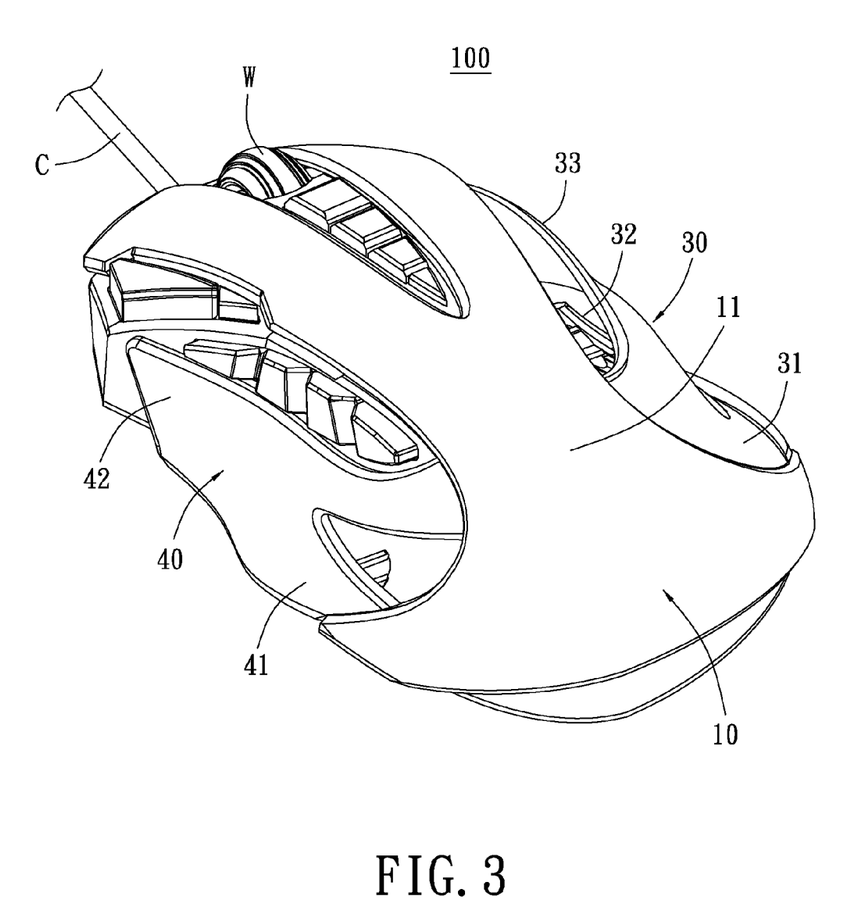
FIG. 3, shows a perspective assembled view of the computer mouse with adjustable decorative wing of the present invention.
Figure 4:
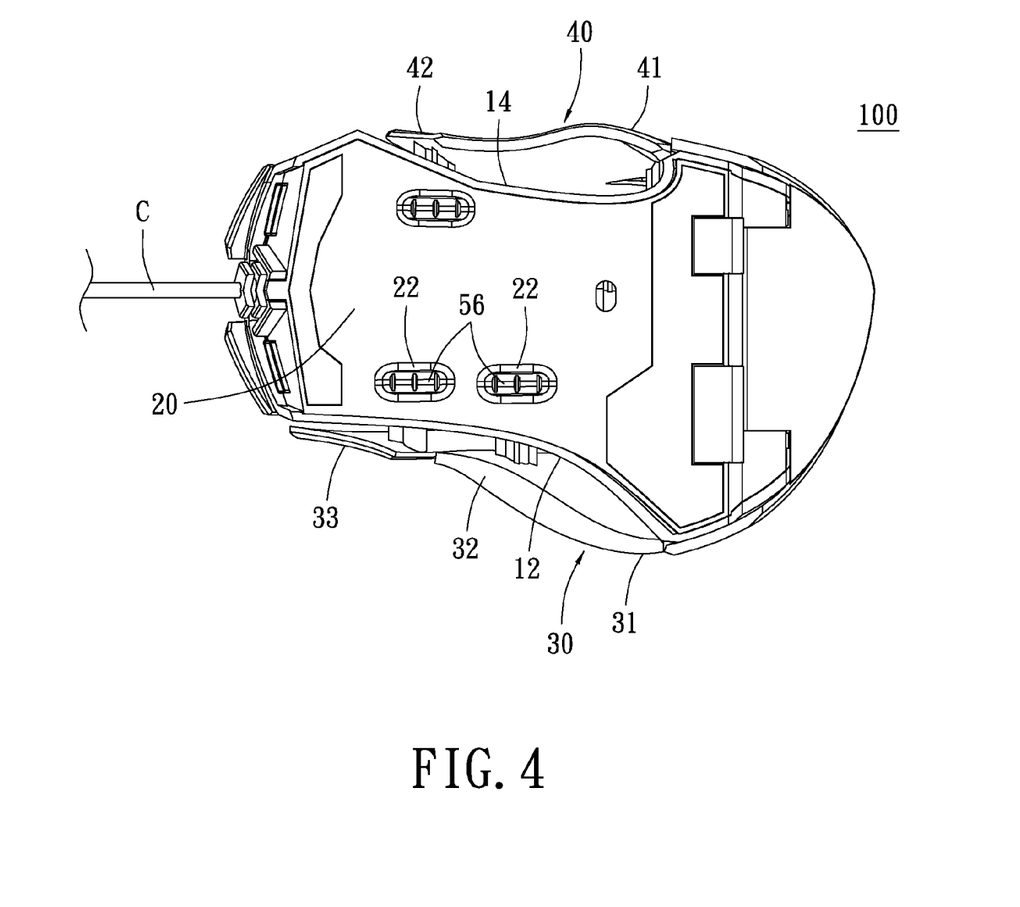
FIG. 4, shows a bottom view of the computer mouse with adjustable decorative wing (non-adjusted) of the present invention.
Figure 5:
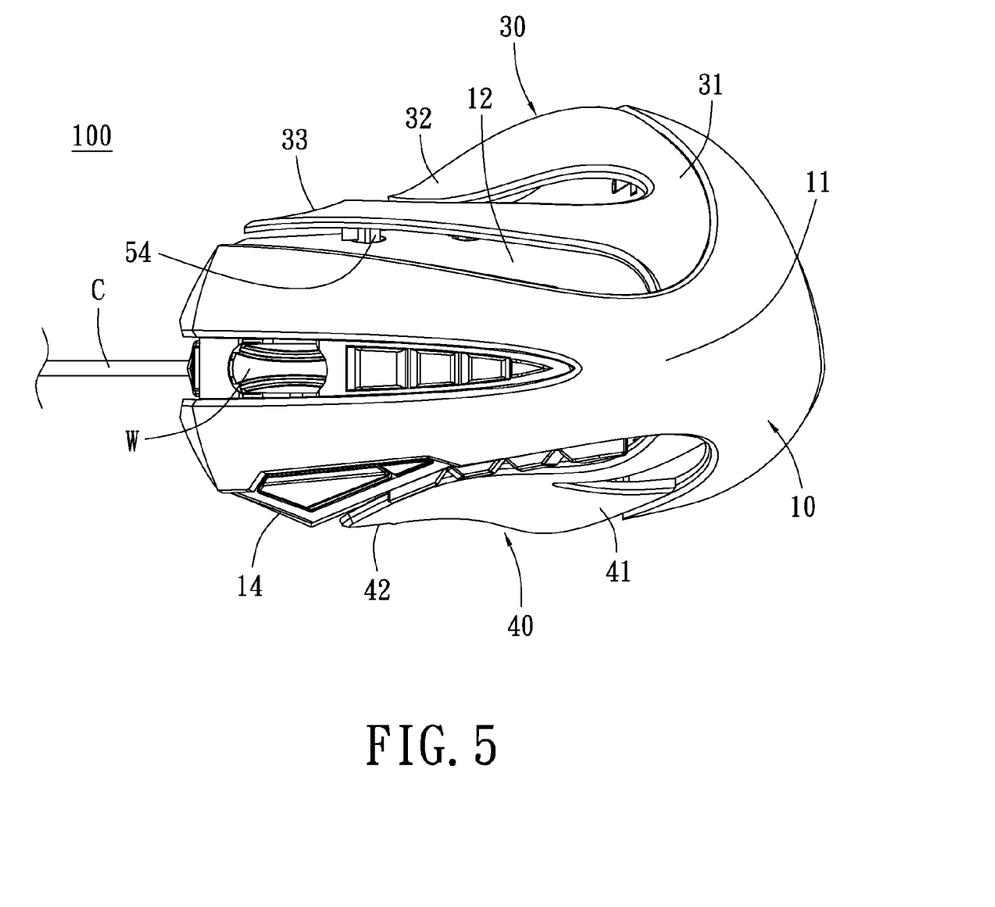
FIG. 5, shows a top view of the computer mouse with adjustable decorative wing (non-adjusted) of the present invention.

In this embodiment, two sides of the main housing 10 are mounted with the decorative wings 30, 40, respectively. However, one practicable embodiment is comprehensible that only one decorative wing is disposed on one side of the main housing 10 according to the present invention. Besides, to be more ergonomic, as shown on left side of FIG. 1, the decorative wing 30 has one end formed with two extending flaps 32, 33, which are split from the fastening end fixed to the main housing 10. Refer to FIG. 3 to FIG. 5, which are a perspective assembled view, bottom view and top view of the computer mouse with adjustable decorative wing according to the present invention. To assume the user used right hand to operate this computer mouse, the ring finger and little finger can be rested on the extending flaps 32, 33 of the decorative wing 30, respectively. And, the thumb can be rested on the decorative wing 40. Each of the extending flaps 32, 33 has one of the distance-adjusting mechanism 50 disposed at an inner side thereof. The decorative wing 40 also has one of the distance-adjusting mechanism 50 disposed at an inner side thereof. In other words, the user can adjust independently the posture that the ring finger, little finger, and thumb can be rested on.

Please refer to FIG. 1 and FIG. 2. To fix the decorative wing 30 to the main housing 10 in this embodiment, the fastening end 31 of the decorative wing 30 has at least one fastening tab extended therefrom toward the main housing 10. The main housing 10 has at least one fixing post to fixedly connect to the fastening tab. In this embodiment, the decorative wing 30 has a pair of fastening tabs 311, 312 pass through the side board 12. The pair of fastening tabs 311, 312 is corresponded to the two extending flaps 32, 33. The main housing 10 has a pair of fixing posts 111 (wherein only one fixing post is shown in FIG. 1, and the other fixing post is lower and hid not shown), the pair of fastening tabs 311, 312 are fixed to the pair of fixing posts 111. Besides, the decorative wing 30 also has a securing board 313 formed between the fastening tabs 311, 312. The securing board 313 is fixed to the side board 12 of the main housing 10 by hooking manner. The side board 12 has two through slots corresponding to the fastening tabs 311, 312. A through slot 121 is shown in FIG. 1 for the fastening tab 311, and the other through slot is covered not shown. A hooking slot (hid and not shown) corresponding to the securing board 313 is perpendicular to the through slot 121.

Please refer to FIG. 1 and FIG. 2. The two decorative wings 30, 40 are linked to the distance-adjusting mechanisms 50, respectively. In this embodiment, both sides of the computer mouse 100 have similar structure, thus only the decorative wing 30 on the left side in FIG. 1 is illustrated as following. Besides, the distance-adjusting mechanism 50 connected with the extending flap 32 is shown in assembled view, and only the distance-adjusting mechanism 50 of exploded view connected to the extending flap 34 is introduced as following.

In this embodiment, the distance-adjusting mechanism 50 includes a mounting seat 52 disposed in the main housing 10, a shaft 54 disposed between the decorative wings 30, 40 and the main housing 10, and a adjusting wheel 56 disposed on the mounting seat 52. The shaft 54 has one end connected to the decorative wing 30, and the other end having a thread structure 55 residing inside the main housing 10 in operation. The thread structure 55 is movable related to the main housing 10. The adjusting wheel 56 is movably screwed to the thread structure 55 to adjust a displacement of the shaft 54.

In this embodiment, the mounting seat 52 has a supporting piece 52a fixed in an inner side of the main housing 10. The supporting piece 52a has a free end formed with a concave portion 520. As shown in FIG. 1, the concave portion 520 is formed on the top end of the supporting piece 52a and substantially U-shaped. The adjusting wheel 56 is rotatably disposed in the concave portion 520. Besides, the mounting seat 52 further includes a carrying piece 52b adjacent to the opening 12. The carrying piece 52b is extended from an inner side of the side board 12 toward the mounting seat 52. The adjusting wheel 56 is rotatably arranged on the carrying piece 52b and the supporting piece 52a. In other words, the adjusting wheel 56 is restricted to rotate between the supporting piece 52a and the carrying piece 52b of the mounting seat 52.

The shaft 54 has one outer end, which is fixedly connected to the decorative wing 30. The shaft 54 can be integrally formed on the decorative wing 30, or can be fixed to the decorative wing 30 by fixing element, such as screws, and is covered with a decorative piece.

The adjusting wheel 56 is formed with a screwing portion to screw on the thread structure 55, so that the shaft 54 can be moved by screwing movement. In this embodiment, a central portion of the adjusting wheel 56 is formed with a screwing portion 560 of internal thread (or female screw), and the thread structure 55 is screwed and passed through the screwing portion 560.

To describe in detail, as shown in FIG. 1, the adjusting wheel 56 has a rim portion 561 and an axial tube 562 passed through a center of the rim portion 561. The screwing portion 560 is formed on an inner surface of the axial tube 562, and the thread structure 55 of the shaft 54 is screwed to the axial tube 562. The thread structure 55 can be integrally formed on a periphery of the shaft 54. In this embodiment, the thread structure 55 is a sleeve having an external thread 551, and the sleeve is fixed on the shaft 54. The bottom board 20 is formed with a wheel hole 22 corresponding to the rim portion 561. The rim portion 561 is partially exposed outside the wheel hole 22 so as to be rotated by user, as shown in FIG. 4. Both edges of the wheel hole 22 are formed with an inclined surface. Since the bottom board 20 has a predetermined thickness, the rim portion 561 is not protruded beyond the bottom surface of the bottom board 20. This embodiment has three wheel holes 22 corresponding to three rim portions 561 of distance-adjusting mechanism 50, which are provided for adjusting the extending flaps 32, 33 of the decorative wing 30 and the decorative wing 40.

Please refer to FIG. 1. To fix the thread structure 55 (which can be called as "sleeve"), this embodiment further includes a stopping piece 58 for fixing the sleeve 55 to the shaft 54. The stopping piece 58 can further block the adjusting wheel 56 from sliding out of the shaft 54. One practicable structure as shown in FIG. 1, the stopping piece 58 has a pin 581 and a clipping portion 582 connected to the pin 581, which is substantially P-shaped. The shaft 54 and the thread structure 55 (or sleeve) are respectively formed with a pin hole 540, 550. The pin 581 passes through the pin hole 540, 550, and the clipping portion 582 is hooked to the distal end of the shaft 54. The shaft 54 of this embodiment is hollow-shaped. The clipping portion 582 is bent from one end of the pin 581 and hooked into one hollow end of the shaft 54.

When user rotates the rim portion 561, the screwing portion 560 has screwing movement to move the thread structure 55 outward or inward. Thus, the shaft 54 has an outward or inward displacement, so that the decorative wings 30, 40 can be expanded or shrank. However, the present invention is not limited to the above-mentioned embodiments. Any structure can make the thread structure to move that is able to apply to the present invention. For example, the adjusting wheel can be a worm gear to push the thread structure 55, or the adjusting wheel can be a gear set, which are changeable embodiments of the present invention.

Figure 6:
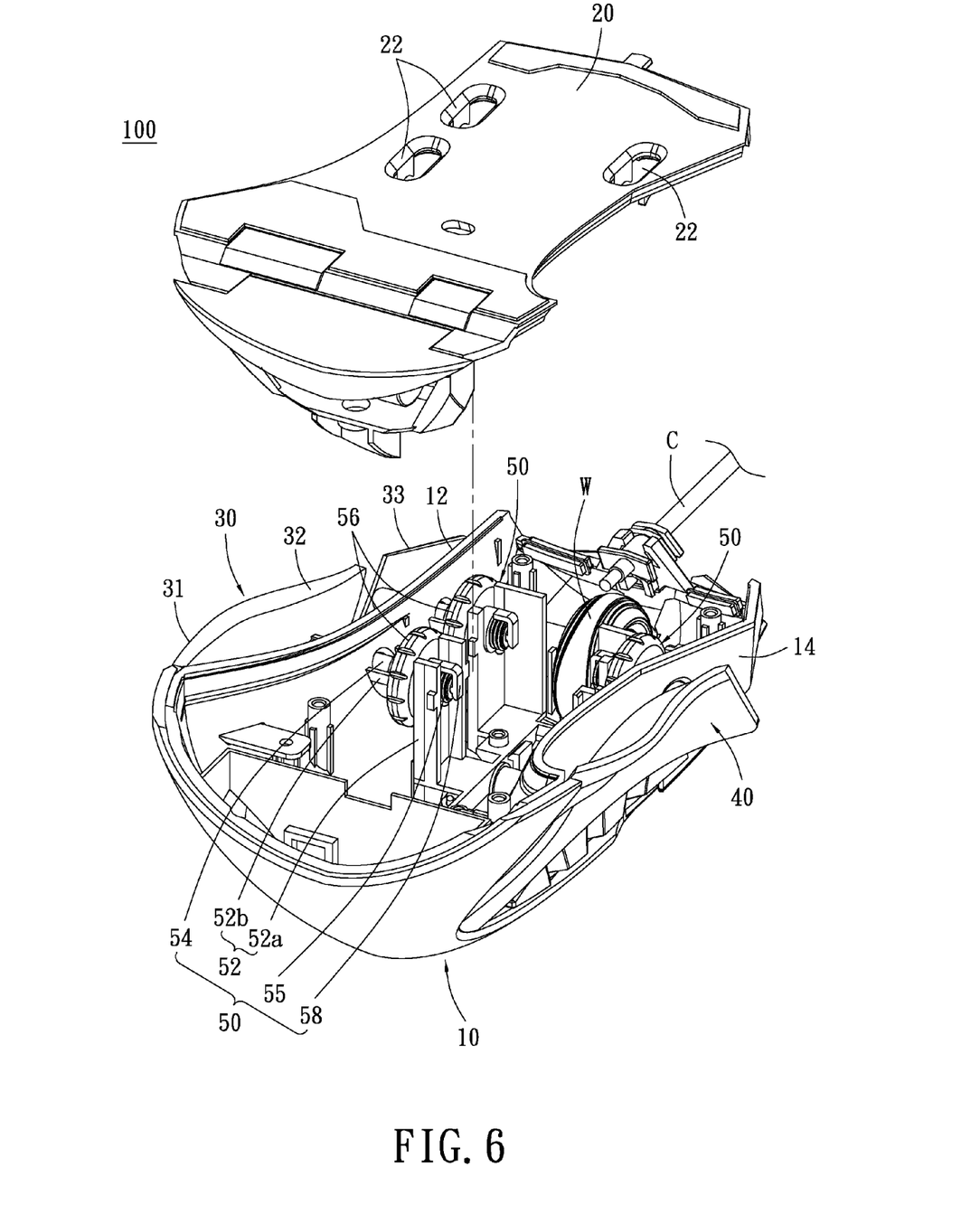
FIG. 6, shows a perspective assembled view of the computer mouse with adjustable decorative wing (adjusted and a bottom board was moved) of the present invention.
Figure 7:
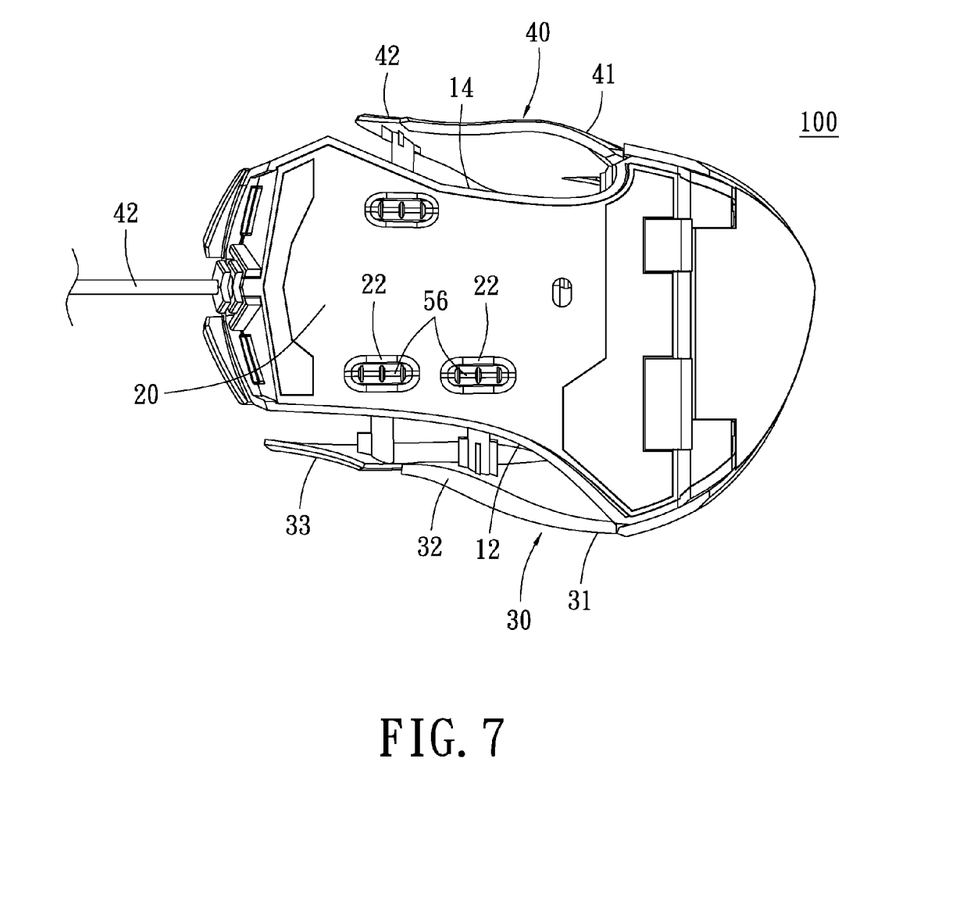
FIG. 7, shows a bottom view of the computer mouse with adjustable decorative wing (adjusted) of the present invention.
Figure 8:
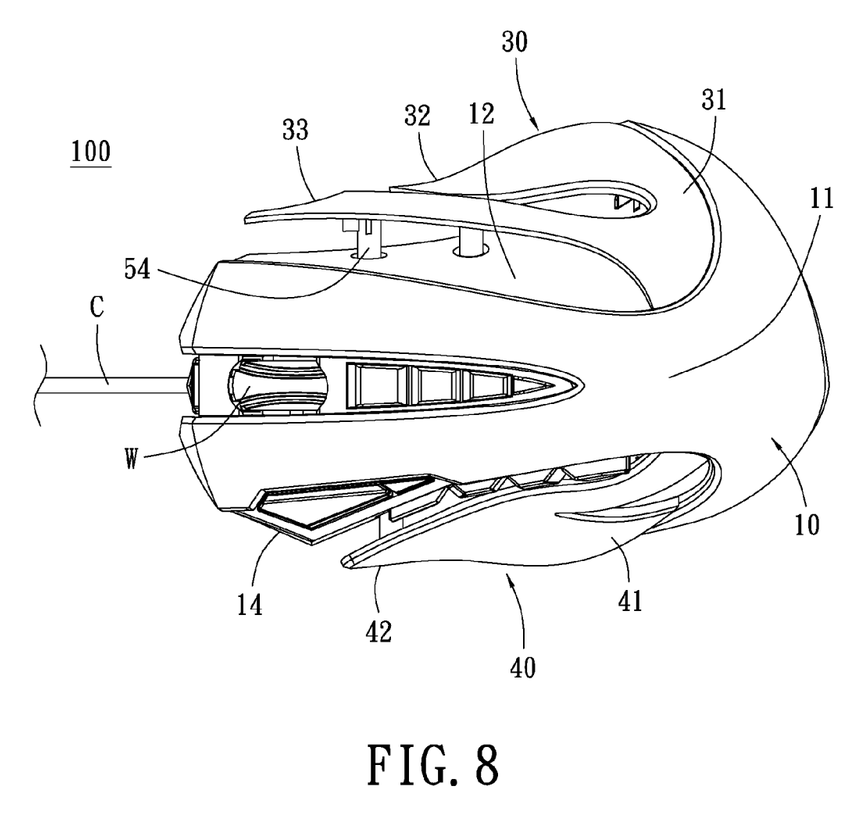
FIG. 8, shows a top view of the computer mouse with adjustable decorative wing (adjusted) of the present invention.

Please refer to FIG. 6, which is a perspective assembled view of computer mouse with adjustable decorative wing (a bottom board is removed) of the present invention. And, refer to FIG. 7 and FIG. 8 together, which are a top view and a bottom view of the present invention. Comparing to FIG. 2, FIG. 4 and FIG. 5, by rotating the adjusting wheel 56, the shaft 54 has moved outward as shown in FIG. 7 and FIG. 8, and push the extending flaps 32, 33 of the decorative wing 30 and the decorative wing 40 to move outward. Please refer to FIG. 5 and FIG. 8 together. The front ends of the decorative wings 30, 40 as shown in FIG. 8 are obviously expanded outwardly, so that the computer mouse of this condition is fitted for a user with a bigger palm. Therefore, the present invention does not need housing of different sizes to fit different users' palms.

The present invention has at least the following advantages. The computer mouse with adjustable decorative wing has the features and functions as following.

1. The computer mouse with adjustable decorative wing allows users themselves to adjust a lateral size of the computer mouse to fit for different users' palms.

2. The computer mouse with adjustable decorative wing arranges the adjusting wheel 56 for adjusting the decorative wings (30, 40) at a bottom thereof in a hidden manner, which is partially exposed outside the bottom board 20.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A computer mouse with adjustable decorative wing, comprising:
   a main housing;
   a bottom board, covered on a bottom of the main housing;
   a decorative wing, disposed at one side of the main housing, the decorative wing having a fastening end fixed to the main housing and a movable end, wherein an adjustable distance is formed between the movable end and the main housing; and
   a distance-adjusting mechanism, disposed on the main housing and against the movable end of the decorative wing so as to adjust the distance between the movable end of the decorative wing and the main housing, thereby a width of the computer mouse is changeable;
   wherein the distance-adjusting mechanism includes:
      a mounting seat formed in the main housing;
      a shaft disposed between the decorative wing and the main housing, the shaft having one end fixedly connected to the decorative wing and the other end having a thread structure residing inside the main housing in operation, and the thread structure is movable related to the main housing; and
      an adjusting wheel disposed in the mounting seat, the adjusting wheel is movably screwed to the thread structure to adjust a displacement of the shaft;
   wherein the mounting seat includes a supporting piece fixed in an inner side of the main housing, and the supporting piece has a concave portion formed on an end thereof;
   wherein the adjusting wheel is rotatably mounted in the concave portion, the adjusting wheel is formed with a screwing portion, the thread structure is screwed to the screwing portion.

2. The computer mouse with adjustable decorative wing according to claim 1, wherein the screwing portion is an internal thread formed at a central portion of the adjusting wheel, wherein the thread structure is screwed and passed through the internal thread.

3. The computer mouse with adjustable decorative wing according to claim 1, wherein the adjusting wheel has a rim portion and an axial tube passed through a center of the rim portion, the screwing portion formed on an inner surface of the axial tube, the thread structure of the shaft is screwed in the axial tube.

4. The computer mouse with adjustable decorative wing according to claim 3, wherein the bottom board has a wheel hole, and the rim portion is partially exposed outside the wheel hole so as to be rotatable by a user.

5. The computer mouse with adjustable decorative wing according to claim 3, wherein the main housing has a side board extended to an inner side of the decorative wing, wherein the side board has an opening, and the shaft passes through the opening.

6. The computer mouse with adjustable decorative wing according to claim 4, wherein the mounting seat further includes a carrying piece formed on an inner side of the side board and adjacent to the opening, the axial tube is rotatably disposed on the carrying piece and the supporting piece.

7. The computer mouse with adjustable decorative wing according to claim 1, wherein the thread structure is a sleeve formed with an external thread, and the sleeve is fixed to the shaft.

8. The computer mouse with adjustable decorative wing according to claim 7, further comprising a stopping piece fixing the sleeve to the shaft, and the stopping piece blocking the adjusting wheel from sliding outside the shaft.

9. The computer mouse with adjustable decorative wing according to claim 8, wherein the stopping piece has a pin and a clipping portion connected to the pin, wherein the shaft and the sleeve are formed with a pin hole respectively, the pin passing through the pin hole, the clipping portion hooking an end of the shaft.

10. The computer mouse with adjustable decorative wing according to claim 1, wherein the fastening end of the decorative wing has at least one fastening tab extended toward the main housing, the main housing has at least one fixing post, the at least one fastening tab is fixed to the least one fixing post.

11. The computer mouse with adjustable decorative wing according to claim 10, wherein the decorative wing has a securing board adjacent to the fastening tab, the securing board is fastened to the main housing.

12. The computer mouse with adjustable decorative wing according to claim 1, wherein the decorative wing has two extending flaps extended from the fastening end fixed to the main housing, for supporting user's ring finger and little finger, wherein each of the extending flaps has one of the distance-adjusting mechanism disposed on an inner side thereof.

13. The computer mouse with adjustable decorative wing according to claim 1, wherein two sides of the main housing have the decorative wing respectively.

\* \* \* \* \*